United States Patent [19]

Korsmeyer

[11] Patent Number: 5,012,975

[45] Date of Patent: May 7, 1991

[54] APPARATUS AND METHOD FOR MIXING AND SPRAYING A SLURRY

[75] Inventor: Richard W. Korsmeyer, East Lyme, Conn.

[73] Assignee: Pfizer Inc., New York, N.Y.

[21] Appl. No.: 482,593

[22] Filed: Feb. 21, 1990

[51] Int. Cl.$^5$ .............................................. B05B 7/04
[52] U.S. Cl. .................................... 239/9; 239/419.3; 239/424; 239/427.5; 366/50
[58] Field of Search ................ 239/427.5, 9, 336, 142, 239/422, 424, 419.3; 366/35, 38, 50, 67, 69, 72, 80, 81, 318, 320, 156

[56] References Cited

U.S. PATENT DOCUMENTS

| | | | |
|---|---|---|---|
| 2,374,732 | 5/1945 | Colburn | 366/35 X |
| 3,272,441 | 9/1966 | Davis et al. | 239/403 |
| 3,275,063 | 9/1966 | Tallor | 159/4 |
| 3,291,396 | 12/1966 | Walter | 239/142 X |
| 3,304,010 | 2/1967 | Cantrell et al. | 239/142 |
| 3,310,240 | 3/1967 | Grundman | 239/404 |
| 3,371,869 | 3/1968 | Hughes | 239/102 |
| 3,408,007 | 10/1968 | Raichle et al. | 239/132 |
| 3,421,693 | 1/1969 | Fraser | 239/15 |
| 3,521,370 | 7/1970 | Senatore | 34/9 |
| 3,533,558 | 10/1970 | Masters | 239/404 |
| 3,868,093 | 2/1975 | Sokolow | 366/172 X |
| 4,042,653 | 8/1977 | Beyn | 264/7 |
| 4,478,519 | 10/1984 | Guibert | 366/318 X |
| 4,561,781 | 12/1985 | Seymour | 366/181 X |

FOREIGN PATENT DOCUMENTS

| | | |
|---|---|---|
| 2746489 | 4/1979 | Fed. Rep. of Germany . |
| 424611 | 6/1972 | U.S.S.R. . |
| 1124578 | 3/1950 | United Kingdom . |

OTHER PUBLICATIONS

Takenaka et al., Preparation of Enteric-Coated Microcapsules for Tableting by Spray-Drying Technique and In Vitro Simulation of Drug Release from the Tablet in GI Tract, Journal of Pharm. Sciences 69:1388–1392 (1980).

Asker et al., Some Spray-Dried Formulations of Sulfaethylthiadiazole for Prolonged-Release Medication, Journal of Pharm. Sciences, 55:90–93 (1966).

Hall, H. S., et al., The Wurster Process in *Controlled Release Technologies: Methods, Theory & Applications,* vol. II, Kydonieus, ed. CRC Press, Boca Raton, FL (1980) pp. 137–138.

*Primary Examiner*—Andres Kashnikow
*Assistant Examiner*—Kevin Weldon
*Attorney, Agent, or Firm*—Peter C. Richardson; J. Trevor Lumb; A. Dean Olson

[57] ABSTRACT

An apparatus for mixing and spraying a slurry. The apparatus comprises a mixing chamber and a screw means, disposed within the chamber, for mixing and transporting material downstream to an air atomization nozzle. Another aspect of this invention is a method for mixing and spraying a slurry. The method comprises introducing and propelling a particulate solid along a mixing chamber. A liquid is introduced downstream from the introduction of the solid, a sufficient distance such that no substantial liquid backs up to the introduction of the solid. The solid and liquid are mixed to form a slurry, substantially in the absence of air. The slurry is propelled downstream, substantially in the absence of air, and atomized.

10 Claims, 1 Drawing Sheet

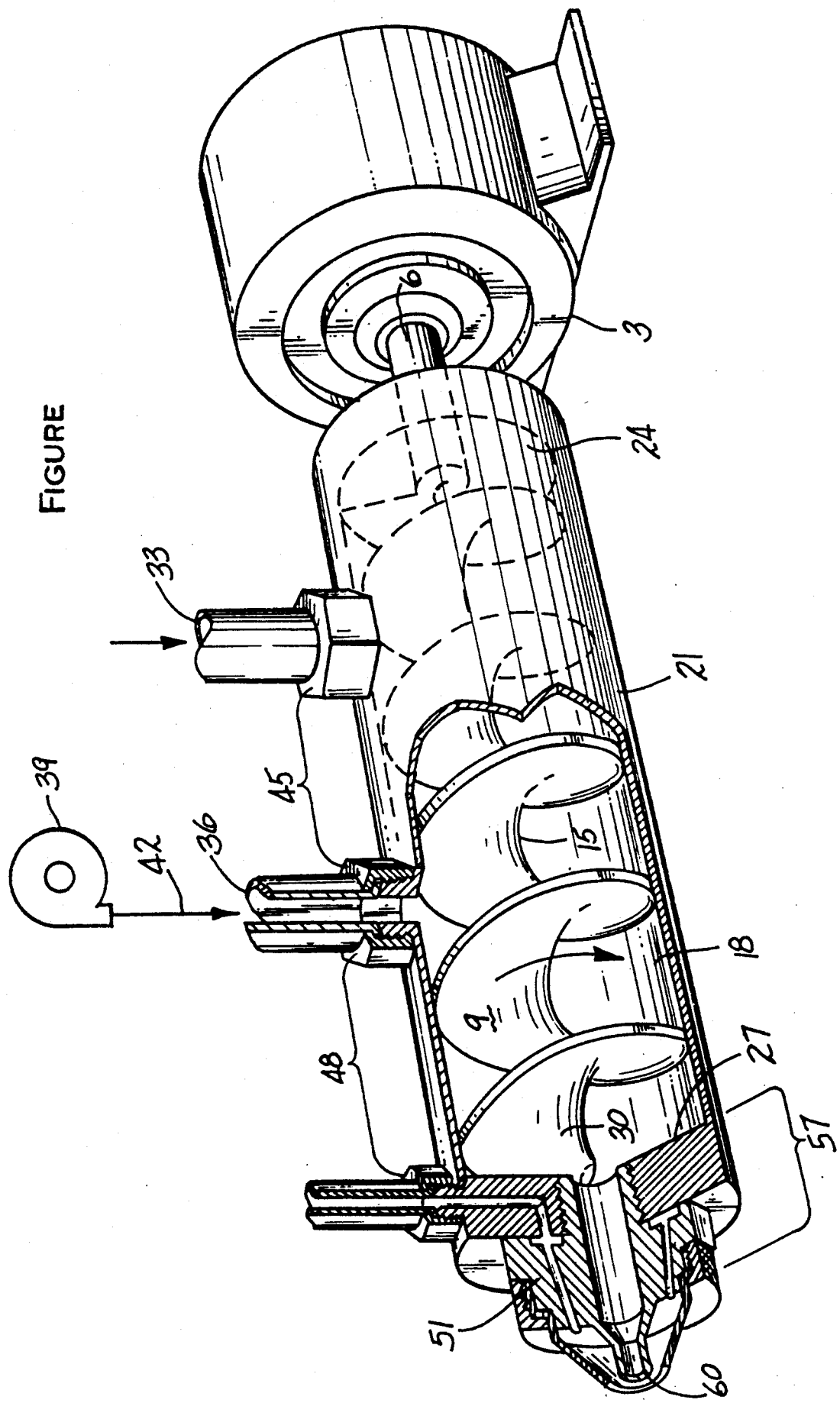

APPARATUS AND METHOD FOR MIXING AND SPRAYING A SLURRY

CROSS-REFERENCE TO RELATED APPLICATION

Attention is directed to commonly assigned copending application, Ser. No. 07/482,623, filed on even date herewith, entitled "Apparatus for Mixing and Spraying a Slurry" which discloses similar apparatuses, the disclosure of which is incorporated by reference.

TECHNICAL FIELD

The field of art to which this invention pertains is apparatuses for mixing solid particles with a liquid and spraying the resulting slurry and methods of using the same.

BACKGROUND ART

The production of coated small particles for use in the drug industry is widely known. Typically have been used. Hall, H.. & Pondell, R E., "The Wurster Process" in *Controlled Release Technologies: Methods, Theory & Applications*, Vol II. A. Kydonieus, ed. CRC Press, Boca Raton, FL 1980, pp. 137–138. In the fluidized bed coating chamber, the solids to be coated are suspended in a heated stream of air. The coating material is sprayed onto the suspended solids until the desired amount of coating has been applied. The coating solution is sprayed slowly over a period of time, so that the fluidized particle bed does not become wet and sticky, resulting in agglomeration. The problem of agglomeration becomes more serious as the size of the core particles decreases, and is particularly acute when coating particles smaller than about 300 μm. The necessity of applying the coating slowly means that each particle receives its coating in many incremental steps as the particle moves through the bed from a region near the coating nozzle to a distant region and back, continuing the cycle throughout the process.

Efforts have been made to replace the slow, incremental coating method with techniques which can produce a coated solid particle in a single rapid step. One technique which has been used is to spray-dry the core material in a film-forming solution of the coating material. The use of ordinary spray-drying atomizers for the process necessitates the use of very small core particles [A. F. Asker and C. H. Becker, J. Pharm. Sci. 55(1), 90 (1966)]. In fact, the difficulty of using this process to coat preformed solid particles is such that most workers have chosen instead to utilize a co-solution of core and coating material. [ibid.; H. Takenaka, Y. Kawashima, and S-Y. Lin, J. Pharm. Sci. 69(12), 1388 (1980); Senatore, U.S. Pat. No. 3,521,370.]

Although these fluid bed coaters and spray dryers are effective for many applications, there is a continuing search for improved coating apparatuses.

SUMMARY OF THE INVENTION

This invention is directed to an apparatus for mixing and spraying a slurry. The apparatus comprises a mixing chamber and a screw means, disposed within the chamber, for mixing and transporting material downstream. The chamber has a first inlet for introducing a particulate solid and a second inlet for introducing a liquid. An air atomization nozzle for dispersing said solid and liquid is in fluid communication with said chamber.

Another aspect of this invention is directed to a method for mixing and spraying a slurry. The method comprises introducing a particulate solid to a mixing chamber at a first point and propelling the particulate solid downstream. A liquid is introduced to the mixing chamber downstream from the first point a sufficient back up to the first point. The solid and liquid are mixed sufficiently to form a uniformly dispersed slurry substantially in the absence of air. The slurry is mixed and propelled downstream to an air atomization nozzle substantially in the absence of air and the slurry is atomized.

Other features and advantages will be apparent from the specification and claims and from the accompanying drawing which illustrates an embodiment of this invention.

BRIEF DESCRIPTION OF DRAWING

The FIGURE is a perspective view of the mixing and spraying apparatus of this invention partly broken away and partly in phantom.

DETAILED DESCRIPTION OF THE INVENTION

A clearer understanding of the invention may be had by reference to the FIGURE. A suitable drive motor 3 provides power to the shaft 6 to turn it in the preselected direction 9. The shaft is typically disposed and supported in a support block. A portion of the shaft 6 is disposed in a mixing chamber 18 of tube 21. The shaft 6 is formed as a screw means (e.g. drive) or auger 15 in mixing chamber 18. Although typically cylindrical, the tube 21 may be divergent or convergent etc. as desired. Typically the screw means 15 is slidably mated with the chamber 18 (e.g so that there is only sufficient clearance to allow free rotation) as this facilitates mixing and transport through the chamber 18. The mixing chamber 18 has an upstream end 24 and downstream end 27 forming a material flow direction. The preselected direction 9 of the shaft 6 is selected so that screw means 15 will transport material disposed within mixing chamber 18 downstream. The screw means 15 is selected to have a thread 30 that in conjunction with the preselected shaft direction 9 transports material disposed within the mixing chamber 18 downstream.

Mixing chamber 18 has a first inlet 33 which, in the applications that this invention is particularly adapted for, is used for addition of a solid particulate. The inlet is typically of sufficient size to facilitate unobstructed loading of the mixing chamber 18. A second inlet 36 is disposed downstream to the first inlet 33. In the applications that this invention is particularly adapted for the second inlet is used for addition of a liquid to the mixing chamber 18. The liquid inlet 36 is disposed downstream of the particulate inlet 33 since the alternative can result in the backup of the liquid and clumping of the solid particulates at their respective inlet. This is believed due to the pressure drops in the downstream flow direction. Preferably the apparatus is substantially airtight downstream of the first inlet as this inhibits the liquid and slurry from clumping. It is especially preferred that the whole apparatus is substantially airtight, although if some air is added with the particulates through the first inlet the effectiveness of the apparatus is not reduced substantially. A pump 39 and feed line 42 may be advantageously used to feed liquids, particularly viscous liquids. For air sensitive liquids a substantially air free feed pump and line are preferred.

Preferably the first inlet 33 and second inlet 36 are spaced apart as this reduces clumping. Preferably the second inlet 36 is spaced apart a sufficient distance such that no substantial liquid backs up to the first inlet 33. A separation distance 45 greater than two flights of the screw 30 aids in reducing clumping particularly when the viscous air sensitive liquids, described below, are used. It is believed that this separation distance 45 inhibits the liquid from forming a solid film (due to the presence of any air such as that introduced with the solid) because vapor from the liquid prevents drying of the film.

The screw means 15 ends at the mixing chamber downstream end 27. A mixing distance 48 between the second inlet 36 and the mixing chamber downstream end 7 is preferably sufficient to provide good mixing of the two component systems resulting in a substantially uniformly dispensed slurry. This is typically at least two flights of the screw means 30.

The mixing chamber 18 is in fluid communication with nozzle 51 at the downstream end 27. The distance 7 from the mixing chamber downstream end 27 to the nozzle exit 60 is preferably short for those applications described below. During this distance 57 there is no active mixing of the slurry and thus settling of the particles can occur. In addition, the below described slurries do not flow readily and since this dead space does not contain the screw transport means 15 downstream flow can become inhibited. Thus preferably the distance 57 is sufficiently short to prevent clogging at the nozzle. Typically this is less than about twice the mixing chamber diameter.

Typically an external air atomization mixing nozzle 51 is utilized since internal mixing nozzles can result in clogging, particularly for those liquids that thicken with exposure to air. Generally a straight unobstructed flow path and uniformly convergent nozzle facilitates the transport of the slurry and dispersion thereof from the nozzle exit 60. Preferably any atomizing nozzle that breaks the slurry into droplets that are of about the size of the solid particles (being mixed) may be used. Slotted opening nozzles may be used to increase throughput. Preferably, the shorter dimension of the slot has a length such that the liquid stream breaks up into droplets approximately the size of solid particles.

These mixing and spraying apparatuses may be used to advantage with a variety of two component systems that are flowable. These include liquid-liquid, liquid-solid and gas-liquid. These apparatuses are particularly advantageous when utilized with liquid-solid systems such as drug delivery systems used in the pharmaceutical industry.

Although any solid particulate may be used with the apparatus of this invention, those friable particles having a size up to about 2 mm are used advantageously in this apparatus. Of particular importance are those friable solid particles having a size of about 2.0 mm to about 100 microns because these are not effectively dispersed by other spray apparatuses.

In addition, the apparatus is of particular utility when used with solids that are soluble or partially soluble in a liquid (such as described below) that is used as part or all of a solid-liquid system. The apparatus can mix the phases and spray the slurries prior to the solid's dissolution by the solvent.

Any composition may be used for the solid including pharmaceutical compositions such as non-pareils, particles produced by milling or by extrusion/spheronization, antiinfectives, antiinflammatories, analgesics, etc.

Any liquid may be used in this apparatus including those useful in the pharmaceutical industry. Combinations of liquids may also be used. Of particular importance are high viscosity liquids of about 300 cps to about 1000 cps and above, since it is difficult to spray these, particularly when in combination with the above described solids. Of particular importance are solutions of polymers in volatile solvents because evaporation of the solvent may lead to clogging of the nozzle.

Examples include solutions of cellulose esters, such as cellulose acetate, cellulose acetate butyrate, cellulose acetate proprionate, cellulose acetate phthalate, or nitrocellulose; or cellulose ethers, such as ethylcellulose in solvents such as acetone, methyl ethyl ketone, or methylene chloride and in mixtures of such solvents with non-solvents such as ethanol, propanol, butanol, glycerol, or water. Also useful are solutions of such polymers as poly(vinyl alcohol) and poly(ethylene-co-vinyl alcohol) in solvents such as water or water-alcohol mixtures. Other examples include polyurethane in dimethylformamide (DMF), poly(vinylidene fluoride) in dimethyl formamide, polysulfone in DMF, poly(methyl methacrylate) with poly(ethylene glycol) in acetone, and polyamide in a water-ethanol mixture.

Although any combination of the particular compositions of phases that works may be used, the apparatus is particularly adapted for mixing and spray coating of two component systems such as those described in commonly assigned copending Application Ser. No. 07/238,371 entitled "The Use of Asymmetric Membranes in Delivery Devices", the disclosure of which is hereby incorporated by reference.

The process by which the membrane is formed is a phase inversion process (R. E. Kesting, "Synthetic Polymeric Membranes," Wiley-Interscience, 2nd Ed., 1985). In this process a polymer solution is induced to undergo phase separation in a particular way, resulting in a structured, continuous polymer phase. In preparing the membrane of the present invention the process can be a wet process or a dry process.

The dry process provides an asymmetric membrane and utilizes a solvent system for the polymer and a pore-forming substance, which is a non-solvent for the polymer. The device is coated with a solution of polymer and pore-forming substance; however, in the dry process the solvent is allowed to evaporate completely. The successful formation of an asymmetric membrane using the dry process requires that the solvent or solvents evaporate more rapidly than the pore-forming substance. In addition, the pore-forming substance must not be a solvent for the polymer.

Solutions of polymers in volatile solvent mixtures suitable for the preparation of asymmetric membranes by the dry process must, of necessity, be susceptible to precipitation of the polymer upon even a slight evaporation of solvent. Thus, preferably the polymer solution is kept enclosed (e.g., not open to air) until the moment when it is desired to form the membrane.

Thus as described in the above-identified patent application and the above paragraphs, combinations of friable particles up to 2 mm preferably about 0.2 mm to about 2 mm and solution polymers in volatile solvents having viscosities of up to 1000 cps and above, preferably about 300 cps to about 1000 cps and above, are advantageously mixed and sprayed using the above described phase inversion process providing uniformly coated particles.

It has been found, unexpectedly, that typical atomizers for spray-drying as described in the background art do not perform well with the above described liquid-solid systems. Atomizers used in the current art are typically of the nozzle type or the centrifugal type. Both types, as currently implemented, are poorly adapted to spraying a slurry of solid particles in a viscous liquid. Typically, most designs involve a long and convoluted path for the liquid to be atomized, which leads to settling of the solid particles and blockage of the liquid path. Many designs, especially centrifugal atomizers also permit extensive contact between the drying atmosphere and the liquid feed prior to atomization, also resulting in rapid clogging of the equipment. It is believed that several properties of the components cause these problems. In the instant apparatus the liquid is maintained substantially free from air contact. Particularly (as described above) when the inlets are separated, a plug of solvent vapor upstream from the liquid inlet aids in preventing drying of any polymer solution that contacts air introduced with the solid particles.

In addition in typical spray drying equipment the solid and liquid are in contact for long periods of time. This can result in the dissolution of the solid by the solvent component of the liquid. In contrast, the instant apparatus minimizes the solid-liquid contact time, reducing that problem. Finally the high viscosity of the polymer solution typically reduces the effectiveness of current atomizers while the auger feed in the present invention transports high viscosity liquids well.

According to the method of this invention the particulate solids are fed through inlet 33 to mixing chamber 18 where screw means 15 contacts and drives the particles downstream. Typically the transport rate is about 0.01 kg/h to about 3.0 kg/h. Downstream the liquid stream is fed through inlet 36 which is preferably spaced apart from the first inlet 33 as described above. The two component system is mixed into a slurry in the mixing chamber 18 by screw means 15 and transported downstream to the nozzle. As described before, the mixing distance (e.g. time) is preferably sufficient to provide a uniformly dispersed slurry and yet not so long that the solid is dissolved by any solvent component of the liquid. In addition the dead space, or distance from the end of the mixing chamber 18 to the nozzle outlet 60, is preferably short to avoid clumping (as there is little mixing) and further dissolution of the solid. After exiting the nozzle outlet 60, the slurry stream is atomized by air streams exiting from the air outlets of the external mixing air atomizing nozzle 51. Typically slurry streams, for nozzle outlet diameters of about 0.1 inch to about 0.15 inch, are about 0.01 kg/h to about 8 kg/h. Slurry streams of about 1 kg/h to about 8 kg/h for a nozzle outlet diameter of about 0.125 inch can be achieved where other spray systems fail. Typical screw rotations are about 50 rpm to about 500 rpm, although the rotation rate may vary from about 10 rpm to about 1000 rpm.

This invention provides rapid and efficient mixing of solid particles with a viscous liquid and transports the resulting slurry to a nozzle with minimal clogging and minimal residence time in the equipment. It also minimizes contact of the liquid with the surrounding atmosphere prior to spraying, thereby reducing undesirable effects, such as premature drying, oxidation, polymerization, degradation, etc. The positive displacement action of the screw transports the solid particles and the slurry more efficiently than other nozzle-feeding means which rely on pneumatic transport alone.

It should be understood that the invention is not limited to the particular embodiments shown and described herein, but that various changes and modifications may be made without departing from the spirit and scope of this novel concept as defined by the following claims.

I claim:

1. An apparatus particularly adapted for mixing and spraying a slurry comprising:

(a) a mixing chamber having an upstream and downstream end;
(b) a screw means, disposed within said chamber, for mixing and transporting material downstream;
(c) said chamber having a first inlet for introducing a particulate solid;
(d) said chamber having a second inlet for introducing a liquid;
(e) said first inlet being upstream of said inlet; and
(f) an air atomization nozzle in fluid communication with said chamber.

2. The apparatus as recited in claim 1 wherein said first inlet is separated from said second inlet by a distance sufficient that substantially no liquid backs up to the first inlet.

3. The apparatus as recited in claim 1 wherein said screw means extends downstream from said second inlet.

4. The apparatus as recited in claim 1 wherein said screw means is immediately adjacent to said air atomization nozzle.

5. The apparatus as recited in claim 1 wherein said chamber is substantially airtight downstream from said first nozzle.

6. A method for mixing and spraying a slurry comprising:

(a) introducing a particulate solid to a mixing chamber at a first predetermined point, said mixing chamber having an upstream and downstream end;
(b) propelling the particulate solid downstream;
(c) introducing a liquid to said mixing chamber downstream a sufficient distance from said first point such that substantially no liquid backs up to the first point;
(d) mixing said liquid and particulate solid sufficiently to form a uniformly dispersed slurry substantially in the absence of air;
(e) mixing and propelling said slurry downstream to an air atomization nozzle substantially in the absence of air; and
(f) atomizing said slurry.

7. The method as recited in claim 6 wherein said particulate solid is a friable particulate having a particle size of about 0.2 mm to about 2 mm.

8. The method as recited in claim 6 wherein said liquid is a volatile solvent containing a dissolved polymer.

9. The method as recited in claim 6 wherein said slurry has a viscosity of about 300 cps to about 1000 cps.

10. The method as recited in claim 6 wherein said slurry is sprayed at a rate of about 0.01 kg/h to about 10 kg/h.

* * * * *

UNITED STATES PATENT AND TRADEMARK OFFICE
CERTIFICATE OF CORRECTION

PATENT NO. : 5,012,975
DATED : May 7, 1991
INVENTOR(S) : Richard W. Korsmeyer

It is certified that error appears in the above-identified patent and that said Letters Patent is hereby corrected as shown below:

Column 1, line 21, after "Typically" add -- fluidized bed systems, such as the Wurster process coater --.

Column 2, line 6, after "sufficient" add -- distance such that no substantial liquid --.

Column 3, line 16, "7" should read -- 27 --.

Column 3, line 22, "7" should read -- 57 --.

Column 6, line 22, after "said" (second occurrence) add -- second --.

Signed and Sealed this

Fifteenth Day of December, 1992

Attest:

DOUGLAS B. COMER

Attesting Officer     Acting Commissioner of Patents and Trademarks